J. G. A. KITCHEN.
BOAT STEERING AND REVERSING GEAR.
APPLICATION FILED FEB. 20, 1919.
1,306,914.
Patented June 17, 1919.
6 SHEETS—SHEET 1.
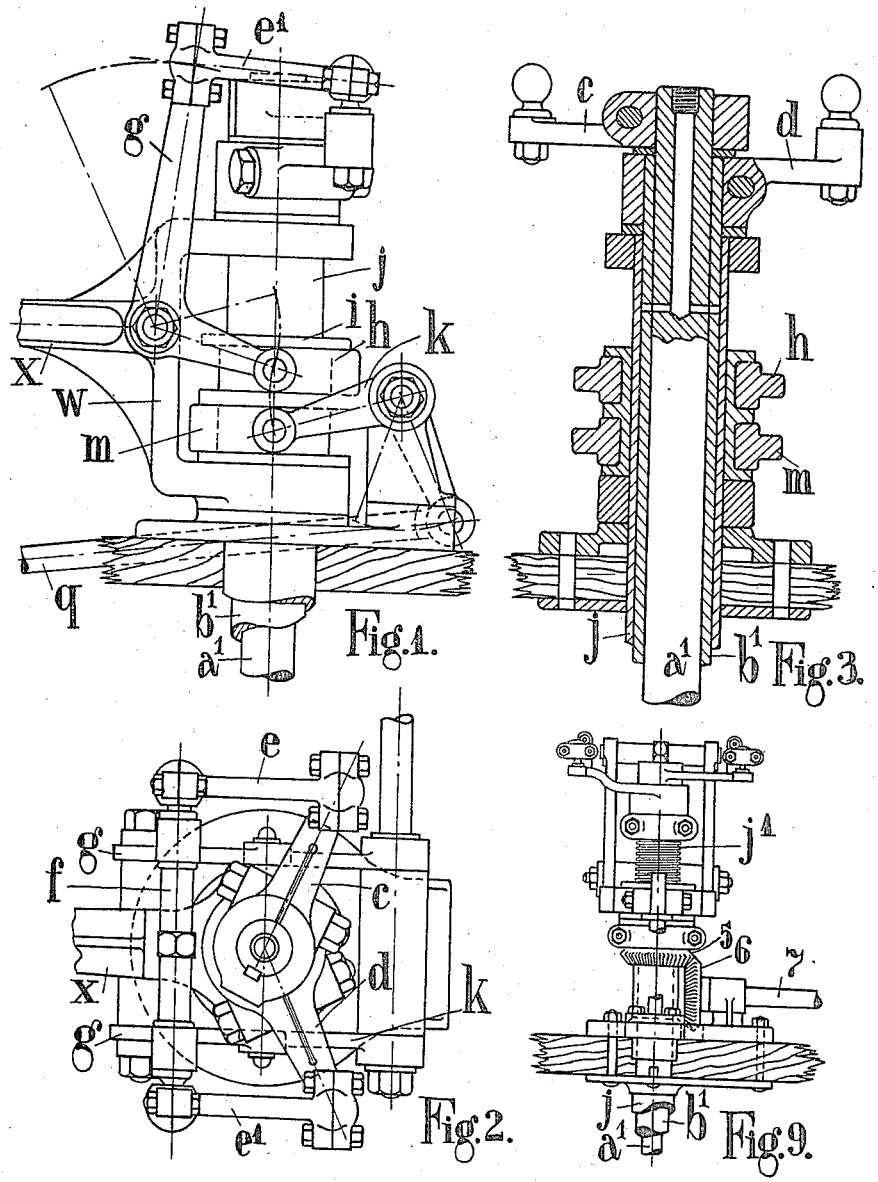
INVENTOR
J.G.A. Kitchen
BY H.R. Kerslake
ATTORNEY

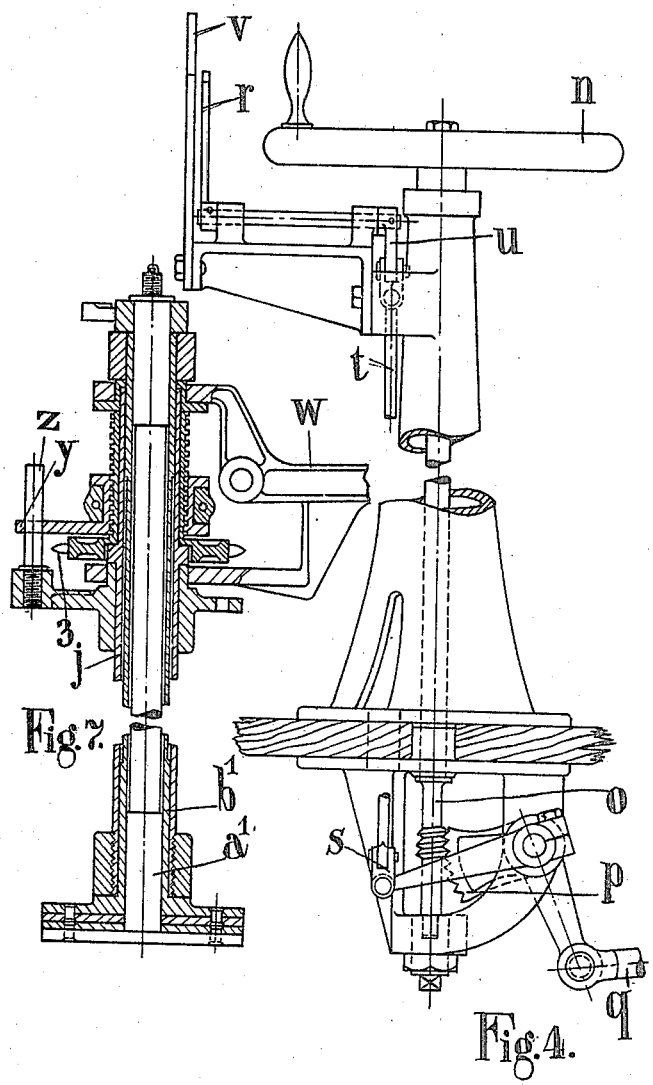

J. G. A. KITCHEN.
BOAT STEERING AND REVERSING GEAR.
APPLICATION FILED FEB. 20, 1919.
1,306,914.
Patented June 17, 1919.
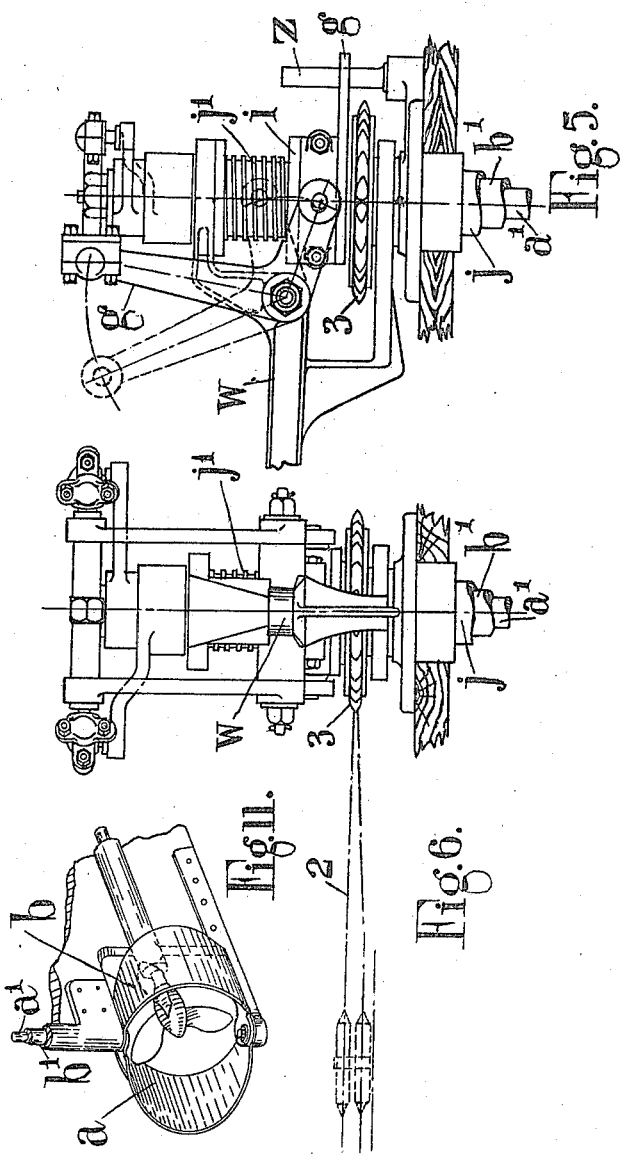
INVENTOR
J. G. A. Kitchen
BY H. R. Kerslake
ATTORNEY J. G. A. KITCHEN.
BOAT STEERING AND REVERSING GEAR.
APPLICATION FILED FEB. 20, 1919.
1,306,914.
Patented June 17, 1919.
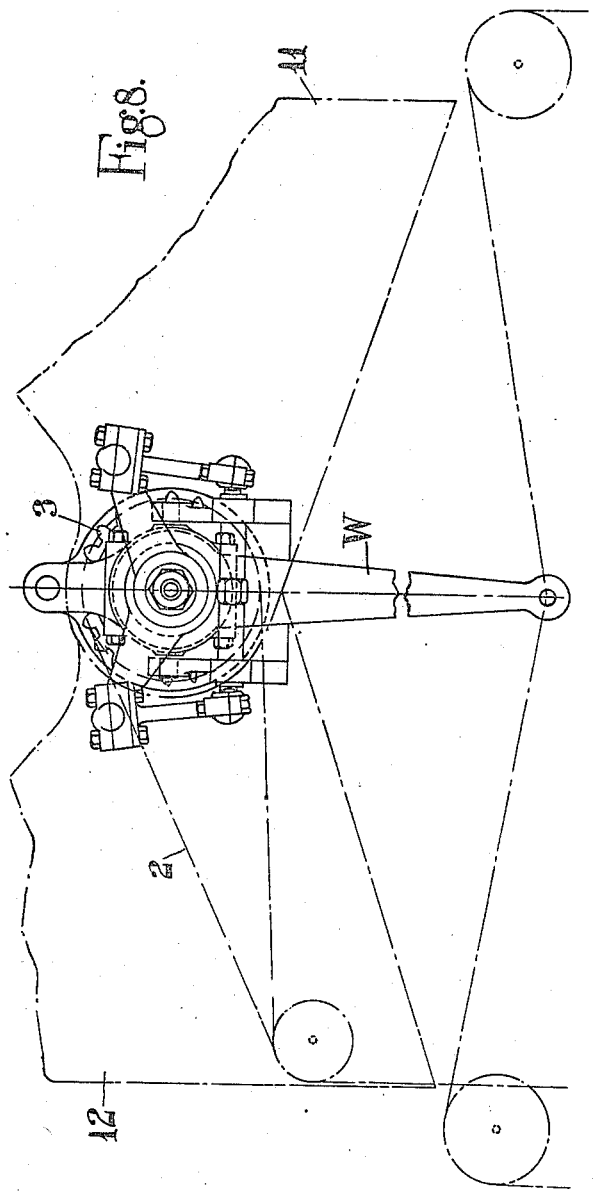
INVENTOR
J.G.A.Kitchen.
BY H.R.Kerslake.
ATTORNEY J. G. A. KITCHEN.
BOAT STEERING AND REVERSING GEAR.
APPLICATION FILED FEB. 20, 1919.

1,306,914.

Patented June 17, 1919.
6 SHEETS—SHEET 5.

INVENTOR
J.G.A.Kitchen
BY H.R.Kerslake
ATTORNEY

J. G. A. KITCHEN.
BOAT STEERING AND REVERSING GEAR.
APPLICATION FILED FEB. 20, 1919.
1,306,914.
Patented June 17, 1919.
6 SHEETS—SHEET 6
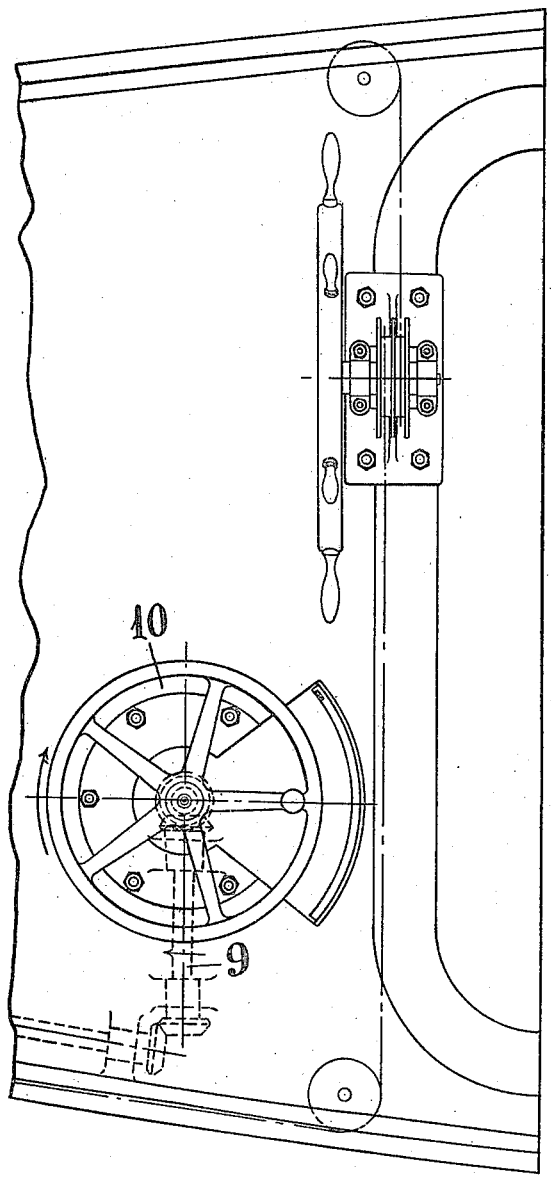
Fig. 10.ª
INVENTOR
J.G.A.Kitchen
BY H.R.Kerslake
ATTORNEY

UNITED STATES PATENT OFFICE.

JOHN GEORGE AULSEBROOK KITCHEN, OF SCOTFORTH, LANCASTER, ENGLAND.

BOAT STEERING AND REVERSING GEAR.

1,306,914.    Specification of Letters Patent.    Patented June 17, 1919.

Application filed February 20, 1919. Serial No. 278,291.

*To all whom it may concern:*

Be it known that I, JOHN GEORGE AULSEBROOK KITCHEN, a subject of the King of Great Britain and Ireland, and resident of 7 Rose Bank, Scotforth, Lancaster, in the county of Lancaster, England, have invented certain new and useful Improvements in Boat Steering and Reversing Gears, of which the following is a specification.

This invention relates to boat steering and reversing gear of the type in which two rudders are mounted, one at each side of the propeller, for the purpose of deflecting or reversing the water driven astern by the propeller in order to effect steering and reversal of the boat.

The object of the present invention is to provide simple and convenient means for readily operating the twin rudders so as to move them simultaneously and through equal angles in the same or in opposite directions.

The invention comprises the improved combinations and arrangements of parts described and claimed.

Referring to the accompanying sheets of explanatory drawings:—

Figure 1 is an elevation, Fig. 2 a plan view and Fig. 3 a sectional elevation showing one convenient form or rudder operating mechanism in accordance with this invention. Fig. 4 illustrates the control means for operating the rudders to reverse the boat.

Figs. 5 and 6 are elevations at right angles to one another, Fig. 7 a sectional elevation and Fig. 8 a plan view showing a modified arrangement of the control gear.

Fig. 9 is an elevation and Figs. 10 and 10<sup>a</sup> plan views illustrating further modifications of the control gear.

Fig. 11 is a diagrammatic perspective view of the rudders.

The same reference letters in the different views indicate the same or similar parts.

Figure 40:
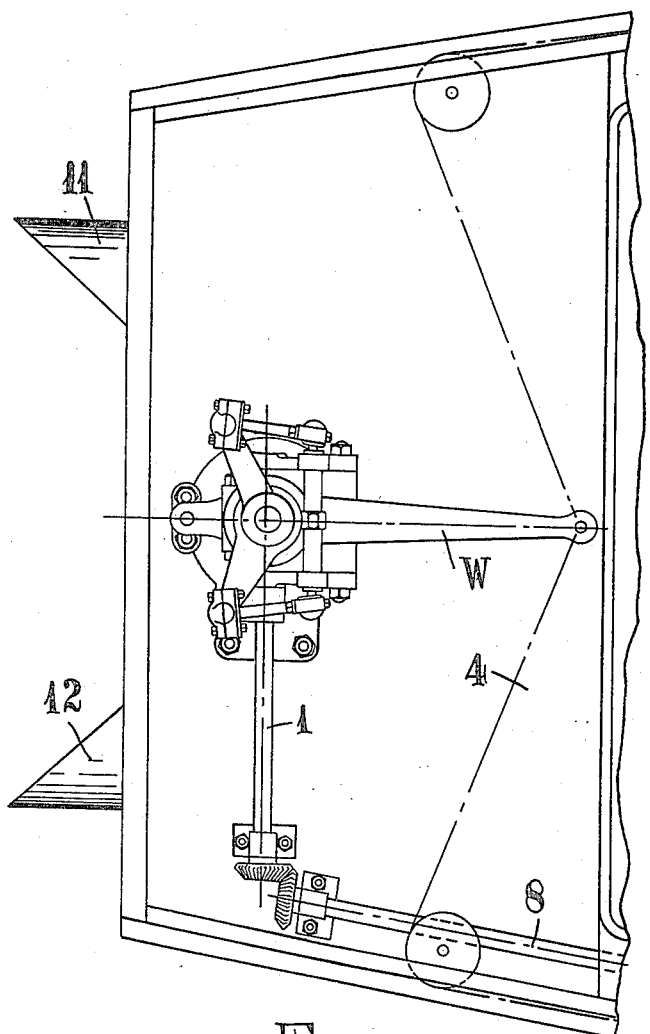

The rudders are constructed and arranged in the manner described in the specification of U. S. Patent No. 1186210, the one rudder $a$ being operated by and secured upon the spindle $a'$, and the other $b$ being operated by and secured upon the sleeve $b'$ around the spindle $a$.

The spindle and sleeve have arms $c$ and $d$ respectively secured thereto as shown in Fig. 3, and each arm is connected by a link $e$, $e'$ with a cross piece $f$ carried by arms of two bell crank levers $g$, the other arms of which are attached to a yoke or collar $h$ in a sleeve $i$. The latter is operated or raised and lowered about the fixed sleeve $j$ by arms $k$ attached to yokes or collars $m$. The actuation of the arms $k$ may be effected through the mechanism shown in Fig. 4 consisting of the hand wheel $n$ and worm shaft $o$ operating the sector $p$ which in turn actuates the connecting rod $q$ and also the indicating finger $r$ by means of the arm $s$, connecting rod and crank arm $u$. $v$ indicates the dial plate over which the finger $r$ moves.

The bell crank levers $g$ are fulcrumed about a frame $w$ which is oscillated about the sleeve $j$ by the tiller bar or its equivalent $x$.

With the arrangement described, when the tiller bar $x$ is moved in a horizontal plane by hand or by power, according to the force required to operate the rudders, the latter are moved simultaneously and through equal angles in the same circular direction. But if the mechanism shown in Fig. 4 be actuated, the bell crank levers $g$ turn about their fulcrums and cause the arms $c$ and $d$, and consequently the rudders they control, to move away from or toward one another through equal angles whereby the reversal and also the retardation of the boat is effected.

In the arrangement shown in Figs. 5 to 8, the sleeve $i$ works as a nut on the threaded sleeve $j'$ the nut being held against rotation by the projecting arm $y$ and stop $z$ and the sleeve $j'$ being rotated by a chain 2 working on the sprocket wheel 3. The tiller arm $w$ may be operated by ropes or chains 4 in any ordinary manner.

In the arrangement shown in Figs. 9, 10, and 10<sup>a</sup>, the threaded sleeve $j'$ is rotated by bevel gears 5, 6 and shafts 7, 8 and 9 from the hand wheel 10.

In Figs. 8, 10 and 10<sup>a</sup> portions of the twin rudders are shown at 11 and 12.

The connecting links $e$, $e'$ are connected to the arms $c$, $d$ and member $f$ by ball and socket joints to permit of the necessary relative angular movements.

I may vary the details of my improved control gear to suit requirements. Both the tiller bar $x$ and the reversing mechanism may be power actuated, if desired.

Having now described my invention, what I claim as new and desire to secure by Letters Patent is:—

1. In boat steering and reversing gear, in combination, two rudders with rudder stocks, arms upon the rudder stocks, levers connected to said arms, a pivotally mounted frame carrying the pivots of said levers, means for moving said frame, and means for oscillating said levers, as set forth.

2. In boat steering and reversing gear, in combination, two rudders with rudder stocks, arms upon the said rudder stocks, levers connected to said arms, a frame fulcrumed concentrically with the rudder stocks carrying said levers, a tiller bar upon said frame and means for oscillating said levers, as set forth.

3. In boat steering and reversing gear, in combination, two rudders with concentric rudder stocks, crank arms upon the rudder stocks, bell crank levers connected to said arms, a frame fulcrumed concentrically with the rudder stocks carrying the pivots of said bell crank levers, means for moving said frame, a collar concentric with the rudder stocks to which the bell crank levers are attached, means for raising and lowering said collar and an indicating finger and dial actuated by the collar operating means, as set forth.

In testimony whereof I have signed my name to this specification.

JOHN GEORGE AULSEBROOK KITCHEN.

Copies of this patent may be obtained for five cents each, by addressing the "Commissioner of Patents, Washington, D. C."